(12) United States Patent
Maynard

(10) Patent No.: US 6,634,061 B1
(45) Date of Patent: Oct. 21, 2003

(54) HINGE

(75) Inventor: Ian Maynard, Hampshire (GB)

(73) Assignee: Nokia Mobile Phones Limited, Espoo (FI)

( * ) Notice: Subject to any disclaimer, the term of this patent is extended or adjusted under 35 U.S.C. 154(b) by 73 days.

(21) Appl. No.: 09/679,284

(22) Filed: Oct. 6, 2000

(30) Foreign Application Priority Data

Oct. 8, 1999 (GB) ............................................. 9923944

(51) Int. Cl.$^7$ ............................................. E05D 11/08
(52) U.S. Cl. ............................. 16/342; 16/319; 16/337; 16/325
(58) Field of Search ......................... 16/337, 342, 257, 16/324, 328, 339, 307, 303, 319, 325, 347, 285, 292, 297, 321; 379/433, 434, 433.13

(56) References Cited

U.S. PATENT DOCUMENTS

| | | | | |
|---|---|---|---|---|
| 2,462,304 A | * | 2/1949 | Burdick ................. 296/97.12 |
| 4,489,974 A | * | 12/1984 | Warhol ................. 296/97.5 |
| 4,653,141 A | * | 3/1987 | Converse | |
| 5,022,778 A | * | 6/1991 | Lu ......................... 403/120 |
| 5,026,108 A | * | 6/1991 | Leahy .................... 296/97.11 |
| 5,101,533 A | * | 4/1992 | Stenger et al. ........... 16/340 |
| 5,141,446 A | | 8/1992 | Ozouf | |
| 5,178,481 A | * | 1/1993 | Kawamura ............... 403/92 |
| 5,239,731 A | * | 8/1993 | Lu | |
| 5,276,945 A | * | 1/1994 | Matsumura | |
| 5,335,273 A | * | 8/1994 | Takagi et al. | |
| 5,454,617 A | * | 10/1995 | Welter ................... 296/97.9 |
| 5,628,089 A | * | 5/1997 | Wilcox et al. | |
| 5,651,063 A | * | 7/1997 | Ji et al. | |
| 5,651,536 A | * | 7/1997 | Daul ..................... 267/205 |
| 5,661,797 A | * | 8/1997 | Leman et al. | |
| 5,715,576 A | * | 2/1998 | Liu ........................ 16/342 |
| 5,752,293 A | * | 5/1998 | Lowry et al. ............ 16/342 |
| 5,765,263 A | * | 6/1998 | Bolinas et al. .......... 16/342 |
| 5,842,235 A | * | 12/1998 | Miyazaki ................. 4/236 |
| 5,987,122 A | * | 11/1999 | Daffara et al. | |
| 6,052,869 A | * | 4/2000 | Suzuki ................... 16/341 |
| 6,148,079 A | * | 11/2000 | Chintala et al. | |
| 6,249,426 B1 | * | 6/2001 | O'Neal et al. .......... 361/681 |
| 6,336,252 B1 | * | 1/2002 | Bando .................... 16/307 |
| 6,345,097 B1 | * | 2/2002 | Chintala | |
| 2002/0042971 A1 | * | 4/2002 | Liao ...................... 16/342 |

FOREIGN PATENT DOCUMENTS

| | | | |
|---|---|---|---|
| EP | 0713313 A1 | | 5/1996 |
| GB | 2119434 | * | 11/1983 |
| GB | 2299371 | | 10/1996 |
| GB | 2300880 | | 11/1996 |
| GB | 2323591 | | 9/1998 |

* cited by examiner

*Primary Examiner*—Gary Estremsky
*Assistant Examiner*—Mark Williams
(74) *Attorney, Agent, or Firm*—Antonelli, Terry, Stout & Kraus, LLP

(57) ABSTRACT

A damped hinge comprising a first part mounted to a second part to allow relative rotation between the first and second part; biasing means for providing rotational movement between the first and second part; wherein upon rotational movement between the first and second part the first and second parts are arranged to cooperate to dampen the rotational movement.

26 Claims, 4 Drawing Sheets

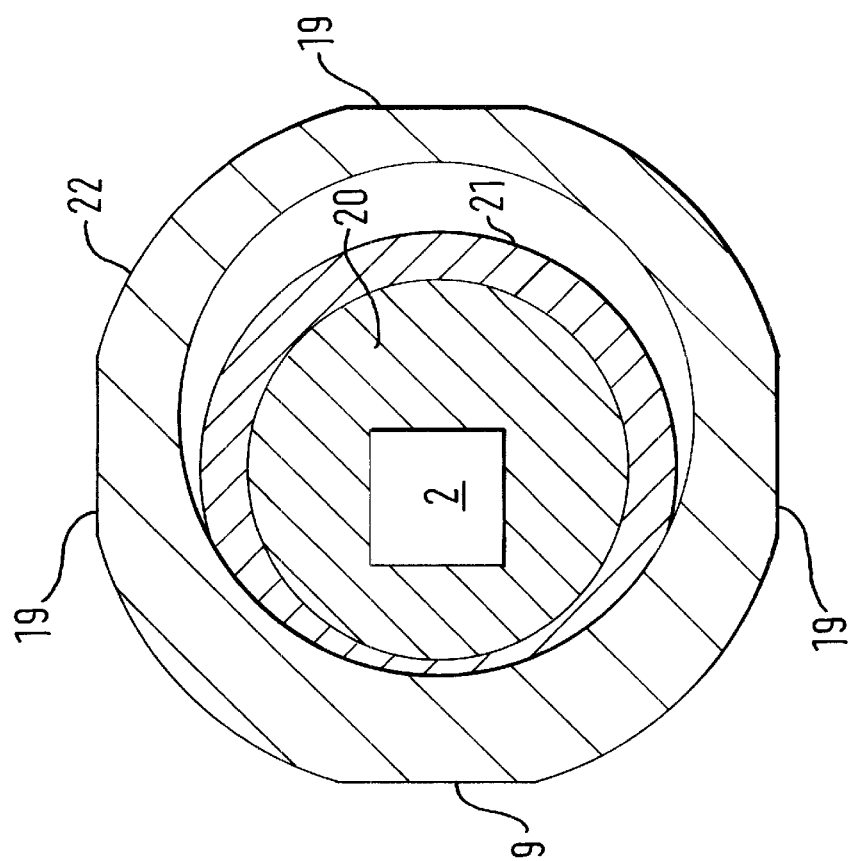
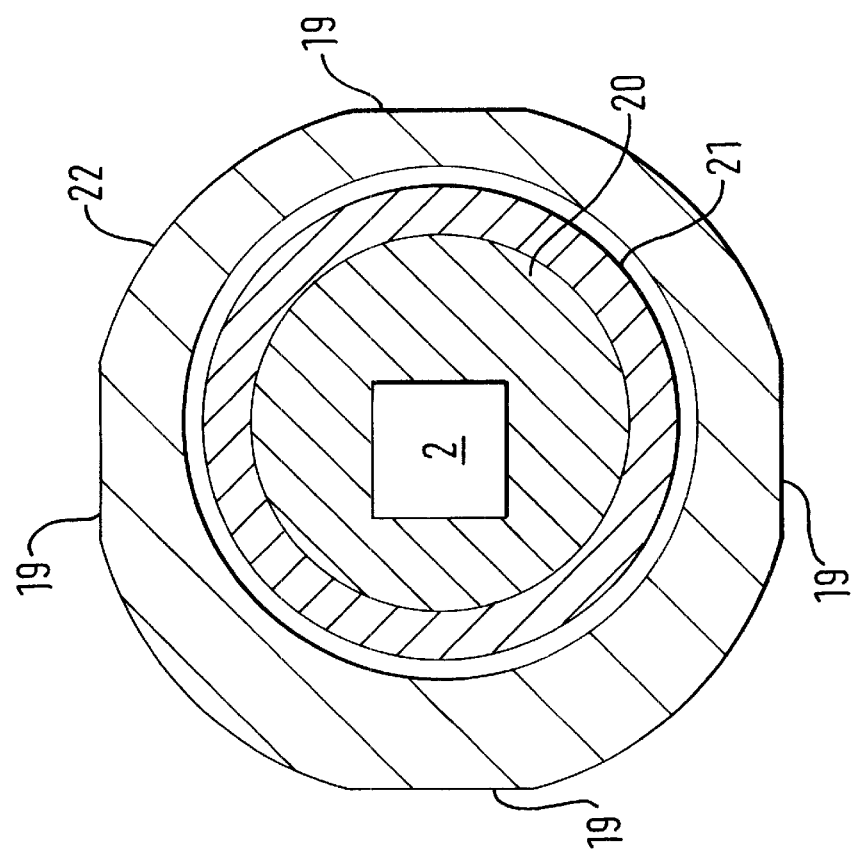

HINGE

BACKGROUND OF THE INVENTION

1. Field of the Invention

This invention relates to a hinge, and in particular a damped hinge.

2. Description of the Prior Art

Spring-biased hinges are commonly used in many consumer products for opening lids or doors automatically on release of a latch. Two examples of such products are radiotelephones and cameras. A spring-biased hinge may be used on a radiotelephone to open a flip, where the flip is used to cover the main radiotelephone housing. A spring-biased hinge may be used on a camera to open a lens cover, where the lens cover is used to protect the lens of the camera.

Typically the hinge is arranged to couple one element of a device to the main housing of the device such that when the element is closed a latch maintains the element in the closed position with the spring bias of the hinge acting against the latch. When the latch is released the spring bias of the hinge rotates the element way from the main housing.

To prevent damage to a device, as a result of a spring-biased hinge rotating open a lid or a door, silicon oil and grease have been incorporated into springbiased hinges to control the rate of rotation of the spring-biased hinge when opening (i.e. dampen the rate of rotation). The oil/grease acts as an energy absorber allowing the hinge to open, under the spring bias, in a relatively slow and controlled manner.

However, the ability of oil/grease to act as an energy absorber can vary with variations in temperature. Further, the manufacture of a damped hinge using oil/grease as an energy absorber can be difficult and complex, which can increase manufacturing costs and may effect the reliability of the hinge. Oil/grease can also leak from the hinge, which may not only create a mess but may also affect the dampening performance of the hinge.

It would be desirable to improve this situation.

SUMMARY OF THE INVENTION

In accordance with a first aspect of the present invention there is provided a damped hinge comprising a first part mounted to a second part to allow relative rotation between the first and second part; biasing means for providing rotational movement between the first and second part; wherein upon rotational movement between the first and second part the first and second parts are arranged to co-operate to dampen the rotational movement.

This has the advantage of minimizing the number of manufacturing processes required for manufacturing the damped hinge while allowing the dampening performance of the hinge to be relatively temperature independent.

Preferably the first and second parts are sized such that upon rotational movement between the first and second part the first part moves against the second part to dampen the rotational movement.

Most preferably the first part includes a resilient element such that upon rotational movement between the first and second part, the resilient element moves against the second part to dampen the rotational movement.

Preferably the first part is eccentrically mounted within the second part with respect to the axis of rotation.

This has the advantage of varying the energy absorption (i.e. dampening) non-linearly, thereby allowing the rate of rotation of the hinge to vary between its open and closed position. This allows the hinge to initially rotate open relatively quickly, for example, with the rotation rate decreasing as the hinge approaches its open position.

Preferably the second part has a cylindrical section for housing the first part, the cylindrical section being eccentrically positioned with respect to the axis of rotation.

Preferably the damped hinge further comprises a latch for maintaining the first part in a first position relative to the second part.

Most preferably, the damped hinge further comprises means responsive to a longitudinal movement with respect to the first or second part of the hinge for releasing the latch, wherein the biasing means is arranged to rotate the first part relative to the second part upon release of the latch.

This has the advantage of allowing the hinge to be opened by depressing the hinge along the hinge's longitudinal axis.

According to a second aspect of the present invention, there is provided an apparatus having a first element, a second element and a hinge, the hinge comprising a first part for mounting to the first element; a second part for mounting to the second element; the first part being mounted to the second part to allow relative rotation between the first and second part; biasing means for providing rotational movement between the first and second part; wherein upon rotational movement between the first and second part the first and second parts are arranged to co-operate to dampen the rotational movement.

In accordance with a third aspect of the present invention there is provided a radiotelephone having a first element, a second element and a hinge, the hinge comprising a first part for mounting to the first element; a second part for mounting to the second element; the first part being mounted to the second part to allow relative rotation between the first and second part; biasing means for providing rotational movement between the first and second part; wherein upon rotational movement between the first and second part the first and second parts are arranged to co-operate to dampen the rotational movement.

BRIEF DESCRIPTION OF THE DRAWINGS

For a better understanding of the present invention and to understand how the same may be brought into effect reference will now be made, by way of example only, to the accompanying drawings, in which:

FIG. 4 shows a cross-sectional view of a hinge along lines B—B in FIG. 1 in a first orientation;

FIG. 5 shows a cross-sectional view of a hinge along lines B—B in FIG. 1 in a second orientation;

DETAILED DESCRIPTION OF THE PREFERRED EMBODIMENT OF THE INVENTION

Figure 1:
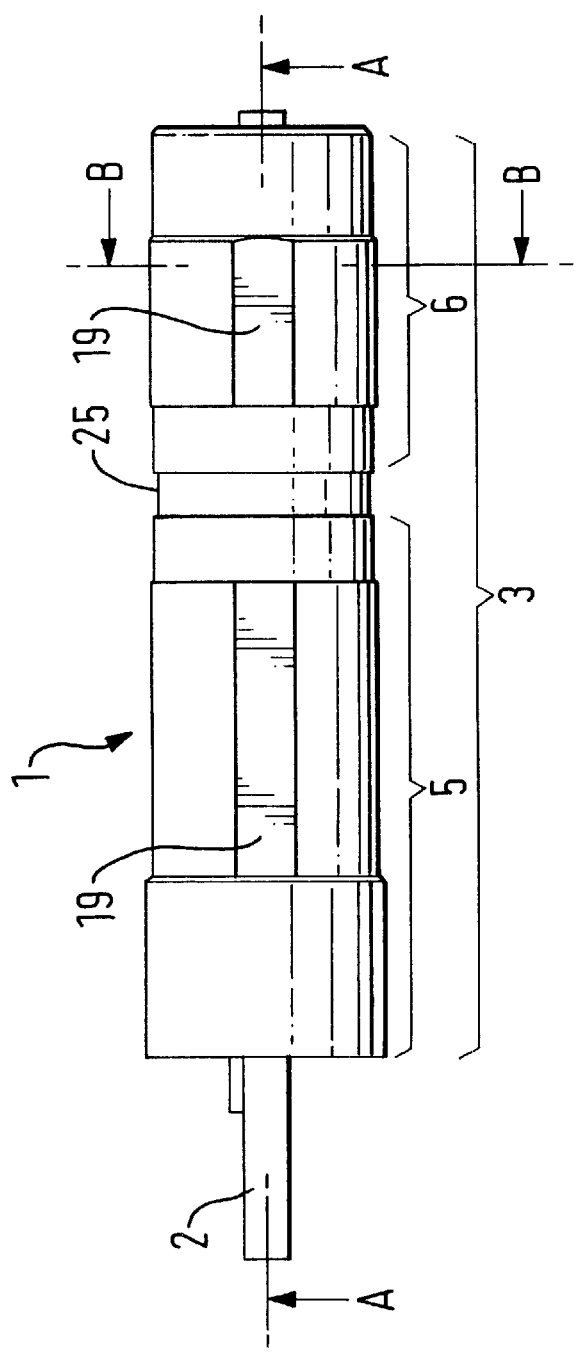
FIG. 1 shows a hinge according to an embodiment of the invention.

FIG. 1 shows a fully assembled damped hinge 1. The hinge 1 has a central shaft 2 and a cylindrical housing 3. The shaft 2 has a rectangular cross-section, which in this embodiment is used for coupling the hinge 1 to the main housing 4 of a radiotelephone. The cylindrical housing 3 comprises two sections, a biasing section 5 for providing rotational bias and damping section 6 for damping the rotation of the hinge. In this embodiment the cylindrical housing 3 is used for coupling the hinge to a lid 7 of a radiotelephone.

Figure 2:
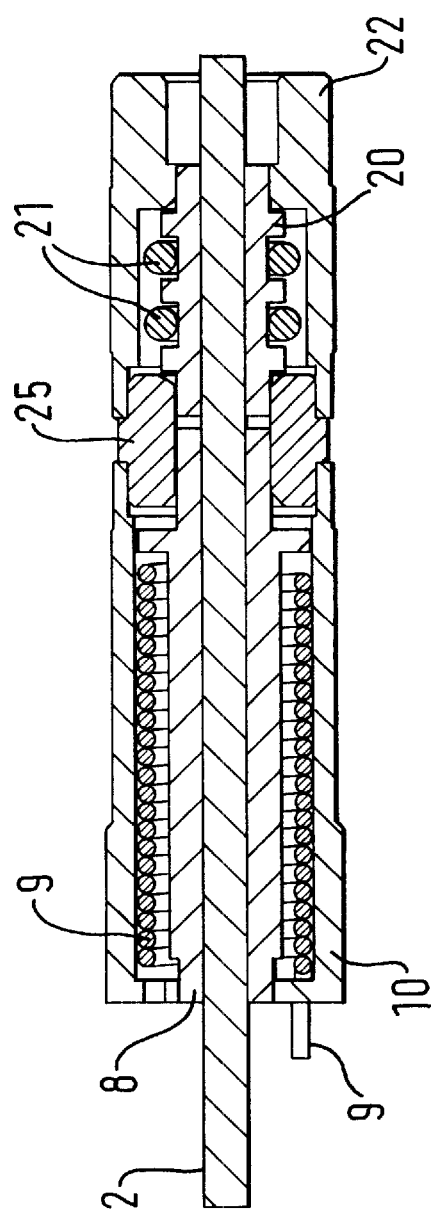
FIG. 2 shows a cross-sectional view of a hinge along lines A—A in FIG. 1.
Figure 3:
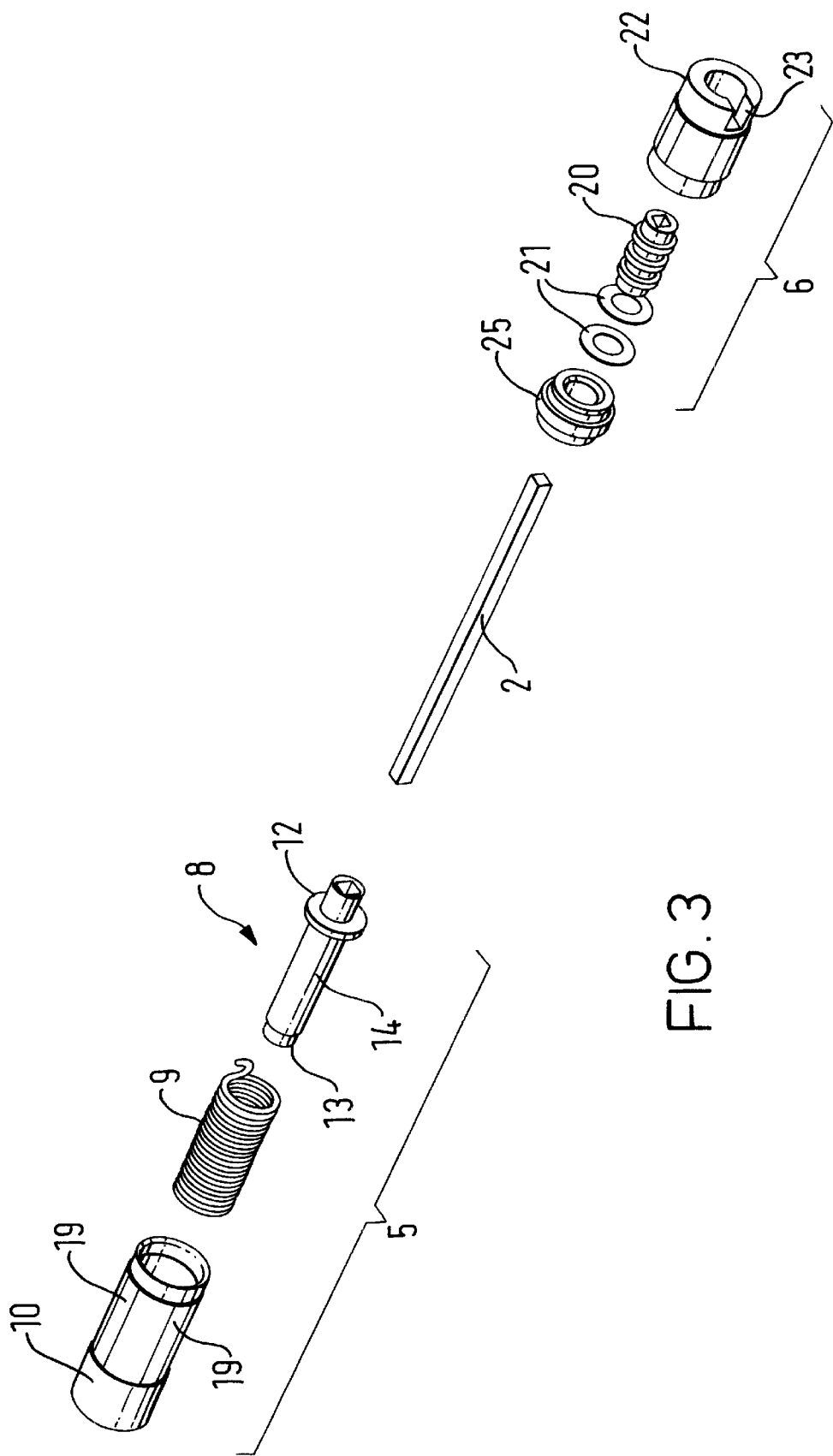
FIG. 3 shows an exploded view of a hinge according to the embodiment of the invention.

FIG. 2 shows a longitudinal cross-section of the hinge 1 along lines A—A. in FIG. 1. FIG. 3 shows an exploded view of the hinge 1. The biasing section 5 of the cylindrical housing 3 comprises a first cylindrical insert 8, a coiled spring 9 and a first outer cylindrical housing 10. The first cylindrical insert 8 has a rectangular aperture, corresponding in size to the rectangular cross-section of the shaft 2, to allow mounting of the insert 8 on the shaft 2. The aperture runs generally through the center of the insert 8. One end of the insert 8 has an annular flange 12. The opposite end of the insert 8, separated from the flange 12 by a main cylindrical section 14, has a section 13 with a slightly reduced diameter when compared with the main cylindrical section 14. The reduced diameter section 13 is for locating the first outer cylindrical housing 10 to the insert 8, as described below.

The coiled spring 9 is slid over the insert 8 until one end of the spring abuts against the flange 12. The end of the spring 9 abutting the flange 12 engages with an aperture in the flange 12, thereby securing the spring 9 to the insert 8. The first outer cylindrical housing 10, which has a central aperture sized to fit over the spring 9 and the flange 12, is slid over the spring 9 and the flange 12.

The end of the first outer cylindrical housing 10, opposite the insert flange 12, has a aperture sized to be slightly larger than the reduced diameter section 13 of the insert 8, while being smaller than the diameter of the main cylindrical section 14 of the insert 8. The end of the first outer cylindrical housing 10 slides over the reduced diameter section 13 of the insert 8 and abuts against the main section 14 of the insert 8, thereby locating the outer cylindrical housing 10 with the insert 8, as shown in FIG. 2.

The end wall of the first outer cylindrical housing 10 has a second aperture for securing the other end of the spring 9 to the cylindrical housing 3.

Consequently, to rotate the cylindrical housing 3 relative to the shaft 2, a force is required to overcome the spring bias of spring 9. Accordingly, when the force is removed the spring bias of spring 9 will cause the cylindrical housing 3 to rotate back, relative to the shaft 2, to its original position.

The outer surface of the first outer cylindrical housing has four flat surfaces 19. The four flat surfaces 19 are for locating the hinge 1 within the lid 7 of a radiotelephone and for preventing the rotation of the cylindrical housing 3 when mounted in the lid 7, as described below.

The damping section 6 of the cylindrical housing 3 comprises a second cylindrical insert 20, two resilient elements 21 (for example 'O' rings), and a second outer cylindrical housing 22.

The second cylindrical insert 20 has a rectangular aperture corresponding in size to the rectangular cross-section of the shaft 2 to allow mounting of the insert to the shaft. The outer surface of the second cylindrical insert 20 has two circumferential grooves in which are located the two 'O' rings 21. The second outer cylindrical housing 22 is slid over the insert 20 and shaft 2 to house the 'O' rings 21 within the cylindrical housing 22. The 'O' rings 21 cooperate with the outer cylindrical housing 22 to dampen rotation of the hinge, as described below.

This embodiment describes a damped hinge with two 'O' rings, however a single 'O' ring may be used.

Figure 6:
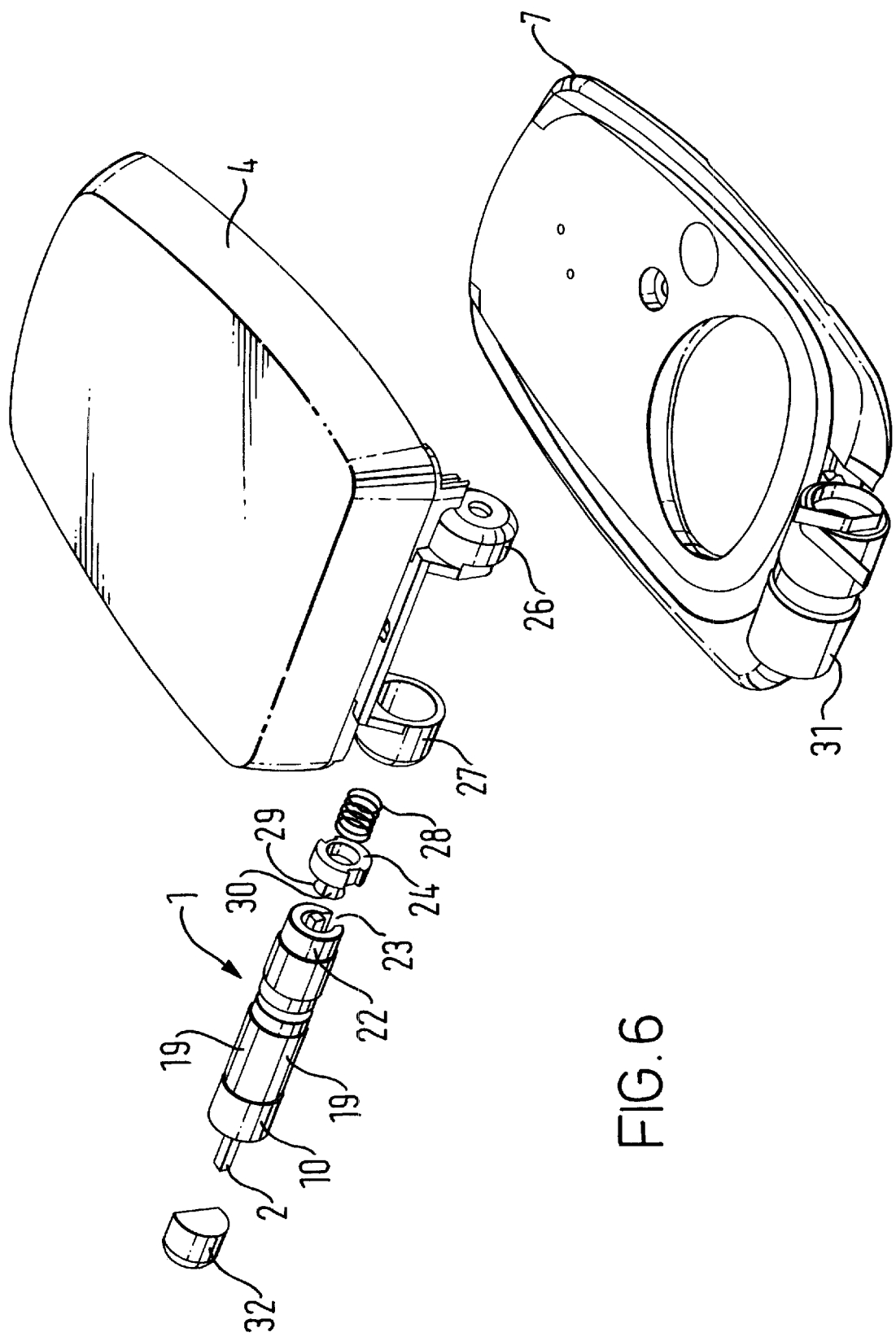
FIG. 6 is an exploded view of a radiotelephone including a hinge according to an embodiment of the invention.

The second outer cylindrical housing 22 has a longitudinal groove 23 for cooperating with a separate lug 30, as shown in FIG. 6, to latch the cylindrical housing 3 in a specific position, as described below.

The damping section 6 and biasing section 5 are coupled via a coupling element 25. The coupling element 25 is annular in shape with a central aperture to allow the coupling element to be slid onto the shaft 2, and to allow rotation relative to the shaft 2. The coupling element 25 is arranged to be push-fit onto the open ends of the biasing section 5 and damping section 6, thereby coupling the two sections 5, 6, as shown in FIG. 2.

FIGS. 4 and 5 show a cross-section of the hinge 1 along the lines B—B in FIG. 1. FIGS. 4 and 5 show different rotational orientations of the shaft 2 relative to the second outer cylindrical housing 22. The center of the shaft 2 represents the axis of rotation of the hinge. The outer circumference of the insert 20 is eccentrically mounted relative to the axis of rotation (i.e. the outer circumference of the insert 20 is positioned off-center relative to the hinge's axis of rotation), with the 'O' rings 21 mounted on the outer circumference of the insert 20. The outer diameter of the 'O' rings 21 is slightly smaller than the diameter of the inner cylindrical aperture of the second outer cylindrical housing 22.

The inner cylindrical aperture of the second outer cylindrical housing 22 is positioned off-center relative to the hinge's axis of rotation by an amount corresponding to the amount the insert 20 is positioned off-center.

The insert 20 and inner cylindrical aperture of the second outer cylindrical housing 22 are arranged so that in one rotational orientation the center of the insert 20 and the center of the inner cylindrical aperture are co-located, with both the center of the insert and the center of the inner cylindrical aperture being off-set from the axis of rotation by the same amount, and in the same direction. In this rotational orientation, there is no direct interaction between the 'O' rings 21 and the inner surface of the outer cylindrical housing 22, as shown in FIG. 4.

As the insert 20 is rotated about the axis of rotation, the center of the insert 20 moves away from the center of the inner cylindrical aperture resulting in the insert 20 becoming offset from the center of the inner cylindrical aperture. As a consequence the 'O' rings 21 start to impinge upon the surface of the inner cylindrical aperture of the second outer cylindrical housing 22 (as shown in FIG. 5), thereby creating a friction force between the insert 20 and the outer cylindrical housing 22 resulting in the dampening of rotational movement between the insert 20 and the outer cylindrical housing 22. As the insert 20 continues to rotate relative to the outer cylindrical housing 22 the 'O' rings 21 are progressively compressed between the insert 20 and the outer cylindrical housing 22 resulting in an increased friction force between the insert 20 and the outer cylindrical housing 22.

Preferably the central offset of the insert 20 and inner cylindrical aperture, relative to the axis of rotation, is less than the thickness of the 'O' rings 21.

FIG. 5 shows the insert 20 having been rotated 180° from the position shown in FIG. 4.

FIG. 6 shows an exploded view of a radiotelephone comprising a main housing 4, a lid 7 and a hinge 1. The upper side of the main housing 4 of the radiotelephone, as viewed by a user, has two mounting bosses 26, 27 extending away from the main housing 4. One mounting boss 26 has a recess in which is located a spring 28 and latching element 24. The mounting boss 26 and latching element 24 have complementary formations which prevent the latching member 24 rotating in the recess while allowing the latching member 24 to move backwards and forwards against the spring 28, in a longitudinal direction.

The latching member 24 has a projecting element 29 that extends way from the recess in a direction towards the other mounting boss 27. The projecting element 29 has a rectangular recess sized to mate with the rectangular cross-section of the shaft 2. Mounted on the projecting element is a lug 30 sized to mate with the groove 23 on the second outer cylindrical housing 22. The second boss 27 on the main housing 4 has a cylindrical aperture sized to allow the cylindrical housing 3 to be pushed through the aperture.

The radiotelephone lid 7 has a mounting boss 31 extending away from the lid. The mounting boss 31 is sized to fit between the two mounting bosses 26, 27 on the main housing 4. The boss 31 has a cylindrical aperture that is sized to accept the cylindrical housing 3 of the hinge. The cylindrical aperture has four flat surfaces to complement the flat surfaces 19 on the cylindrical housing 3. When the cylindrical housing 3 is mounted in the mounting boss 31 the complementary flat surfaces prevent the cylindrical housing 3 rotating relative to the mounting boss 31.

When the cylindrical housing 3 is mounted in the mounting boss 31, the end of the shaft 2 closest to the second outer cylindrical housing 22 engages with the recess of the projecting element 29, thereby coupling the main housing 4 to the lid 7.

Located in the second mounting boss 27 of the main housing 4 is a release button 32 that is coupled to the other end of the shaft 2.

The hinge 1 is arranged so that when the lid 7 is closed over the main housing 4, the cylindrical housing 3 is rotated relative to the shaft 2, thereby imparting a spring bias between the shaft 2 and the cylindrical housing 3. Additionally the lug 30 on the latching element 24 is arranged to align with the groove 23 on the second outer cylindrical housing 22. When the lug 30 and groove 23 are aligned, the spring 28 causes the lug 30 to engage with the groove 23, thereby latching the lid 7 closed. Additionally, when the lid 7 is closed the center of the insert 20 and the center of the aperture of the second outer cylindrical housing 22 are arranged to coincide, as shown in FIG. 4.

When the release button 32 is pushed inward along the longitudinal axis of the hinge 1, the shaft 2 is moved inwards disengaging the latching element 24 from the groove 23 on the second outer cylindrical housing 22. Upon the latching element 24 being disengaged from the second cylindrical housing 22, the spring bias of the hinge causes the lid 7 to rotate into an open position.

As the hinge rotates open, the center of the second insert 20 moves away from the center of the aperture of the second outer cylindrical housing 22 causing the 'O' rings 21 to engage with the inner surface of the outer cylindrical housing 22, thereby dampening the rate of rotation. As the angle of rotation increase, the amount of dampening resulting from the 'O' rings 21 increases as the 'O' rings move against the inner surface of the outer cylindrical housing 22.

As the diameter of the 'O' rings 21 is slightly smaller than the aperture of the second cylindrical housing 22, when the latching element 24 is initially disengaged from the second cylindrical housing 22, causing the lid 7 to rotate relative to the main housing 4, the 'O' rings 21 do not touch the inner surface. Consequently, the lid 7 initially rotates relatively quickly. The 'O' rings 21 start to rub against the inner surface of the cylindrical housing 22 after approximately 50° of rotation resulting in a gradual decrease in the rate of rotation after 50° of rotation.

The present invention many novel feature or combination of features disclosed herein either explicitly or any generalization thereof irrespective of whether or not relating to the present claimed invention or mitigates any or all of the probles addressed. In view of the foregoing description it will be evident to a person skilled in the art that various modifications may be made within the scope of the invention. For example, the insert 20 may rub directly against the inner surface of the second outer cylindrical housing 22.

What is claimed is:

1. A damped hinge comprising:

a first part eccentrically mounted with a second part to allow relative eccentric rotation between the first and second part;

biasing means for providing biased eccentric rotational movement between the first and second part; and wherein the first part includes a resilient element which upon rotational eccentric movement between the first and second part, abuts and is progressively compressed against the second part to dampen the rotational movement.

2. A damped hinge according to claim 1, wherein:

the first part is co-axially mounted within the second part.

3. A damped hinge according to claim 2, wherein:

the first and second parts are sized such that upon rotational movement between the first and second part the first part moves against the second part to dampen the rotational movement.

4. A damped hinge according to claim 3, wherein:

the first part is eccentrically mounted within the second part with respect to an axis of rotation of the first part.

5. A damped hinge according to claim 4, wherein:

the second part has a cylindrical section for housing the first part, the cylindrical section being eccentrically positioned with respect to the axis of rotation of the first part.

6. A damped hinge according to claim 3, wherein:

the second part has a cylindrical section for housing the first part, the cylindrical section being eccentrically positioned with respect to the axis of rotation of the first part.

7. A damped hinge according to claim 2, wherein:

the first part is eccentrically mounted within the second part with respect to an axis of rotation of the first part.

8. A damped hinge according to claim 7, wherein:

the second part has a cylindrical section for housing the first part, the cylindrical section being eccentrically positioned with respect to the axis of rotation of the first part.

9. A damped hinge according to claim 2, wherein:

the second part has a cylindrical section for housing the first part, the cylindrical section being eccentrically positioned with respect to an axis of rotation of the first part.

10. A damped hinge according to claim 1, wherein:

the first and second parts are sized such that upon rotational movement between the first and second part the first part moves against the second part to dampen the rotational movement.

11. A damped hinge according to claim 10, wherein:

the first part is eccentrically mounted within the second part with respect to an axis of rotation of the first part.

12. A damped hinge according to claim 11, wherein:

the second part has a cylindrical section for housing the first part, the cylindrical section being eccentrically positioned with respect to the axis of rotation of the first part.

13. A damped hinge according to claim 10, wherein:

the second part has a cylindrical section for housing the first part, the cylindrical section being eccentrically positioned with respect to an axis of rotation of the first part.

14. A damped hinge according to claim 1, wherein:

the first part is eccentrically mounted within the second part with respect to an axis of rotation of the first part.

15. A damped hinge according to claim 14, wherein:

the second part has a cylindrical section for housing the first part, the cylindrical section being eccentrically positioned with respect to the axis of rotation of the first part.

16. A damped hinge according to claim 1, wherein:

the second part has a cylindrical section for housing the first part, the cylindrical section being eccentrically positioned with respect to an axis of rotation of the first part.

17. A damped hinge according to claim 1, comprising:

a latch for maintaining the first part in a first position relative to the second part.

18. A damped hinge according to claim 17, comprising:

means, responsive to a longitudinal movement with respect to the first or second part of the hinge, for releasing the latch; and wherein the biasing means is arranged to rotate the first part relative to the second part upon release of the latch.

19. A damped hinge according to claim 1, wherein:

the biasing means comprises a spring.

20. A damped hinge in accordance with claim 19 wherein:

the spring is a coil spring.

21. An apparatus comprising a first element, a second element and a damped hinge, the damped hinge including a first part for connection to the first element; a second part for connection to the second element; the first part being eccentrically mounted within the second part to allow relative eccentric rotation between the first and second part; biasing means for providing biased controlled eccentric rotational movement between the first and second part; and wherein the first element includes a resilient element which, upon rotational eccentric movement between the first and second part, abuts and is progressively compressed against the second part to dampen the rotational movement.

22. An apparatus in accordance with claim 21 wherein:

the biasing means comprises a spring.

23. An apparatus in accordance with claim 22 wherein:

the spring is a coil spring.

24. A radiotelephone comprising a first element, a second element and a damped hinge, the damped hinge including a first part for connection to the first element; a second part for connection to the second element; the first part being eccentrically mounted within the second part to allow relative eccentric rotation between the first and second part; biasing means for providing biased controlled eccentric rotational movement between the first and second part; and wherein the first element includes a resilient element which, upon rotational eccentric movement between the first and second part, abuts and is progressively compressed against the second part to dampen the rotational movement.

25. A radio telephone in accordance with claim 24 wherein:

the biasing means comprises a spring.

26. A radio telephone in accordance with claim 25 wherein:

the biasing means comprises a spring.

* * * * *